(12) United States Patent
Schürle et al.

(10) Patent No.: US 6,920,914 B2
(45) Date of Patent: Jul. 26, 2005

(54) AIR TREATMENT MODULE, PARTICULARLY FOR THERMAL TREATMENT OF AIR TO BE INTRODUCED INTO A VEHICLE INTERIOR OF A VEHICLE

(75) Inventors: Christian Schürle, Neu-Um (DE); Michael Humburg, Göppingen (DE); Horst Riehl, Bad Rodach (DE)

(73) Assignees: J. Eberspacher GmbH & Co. KG, Esslingen (DE); part interest; Valeo Klimasysteme GmbH, Bad Rodach (DE); part interest ( * ) Notice: Subject to any disclaimer, the term of this patent is extended or adjusted under 35 U.S.C. 154(b) by 0 days.

(21) Appl. No.: 10/600,678

(22) Filed: Jun. 19, 2003

(65) Prior Publication Data

US 2004/0069445 A1 Apr. 15, 2004

(30) Foreign Application Priority Data

Jun. 20, 2002 (DE) ......................................... 102 27 623

(51) Int. Cl.[7] .......................... F25B 29/00; B60H 1/22; B60H 1/00; B60H 3/00
(52) U.S. Cl. ...................... 165/42; 165/43; 237/12.3 C; 237/12.3 B; 237/12.3 R; 237/12.3 A
(58) Field of Search ....................... 237/12.3 A, 12.3 C, 237/12.3 B, 12.3 R; 165/42, 43

(56) References Cited

U.S. PATENT DOCUMENTS

| 4,459,466 A | | 7/1984 | Nakagawa et al. ......... 219/367 |
|---|---|---|---|
| 4,749,028 A | * | 6/1988 | Okura et al. ................... 165/42 |
| 5,413,279 A | | 5/1995 | Quaas et al. ........... 237/12.3 C |
| 6,044,656 A | * | 4/2000 | Shirota et al. ................. 62/244 |
| 6,076,593 A | * | 6/2000 | Takagi et al. .................. 165/43 |

FOREIGN PATENT DOCUMENTS

| DE | 39 14834 A1 | 11/1990 | ............ B60H/1/22 |
|---|---|---|---|
| DE | 39 43 335 A1 | 7/1991 | ............ B60H/1/22 |
| DE | 40 14 501 C2 | 8/1993 | ............ B60H/1/22 |
| DE | 195 39 517 A 1 | 10/1995 | ............ B60H/1/12 |
| DE | 196 37 020 A1 | 3/1998 | ............ B60H/1/22 |
| DE | 196 50 942 A1 | 6/1998 | ............ B60H/1/22 |
| EP | 0 846 580 A2 | 6/1998 | ............ B60H/1/00 |

OTHER PUBLICATIONS

"Deutsches Patent–und Markenamt" (Search Report from the German Patent Office in examining the priority application for the present application), dated Mar. 10, 2002, with copies of references cited.

* cited by examiner

Primary Examiner—John K. Ford

(57) ABSTRACT

An air treatment module, in particular for thermal treatment of air to be introduced into the vehicle interior of a vehicle, includes a support arrangement to be fixed to a vehicle, a fan arrangement supported by the support arrangement, a first heat exchanger arrangement, supported on the support arrangement, for thermal treatment of air forwarded by the fan arrangement, further including a heating device and a second heat exchanger arrangement receiving heat from the heating device, the heating device and the second heat exchanger arrangement being supported on the support arrangement.

8 Claims, 1 Drawing Sheet

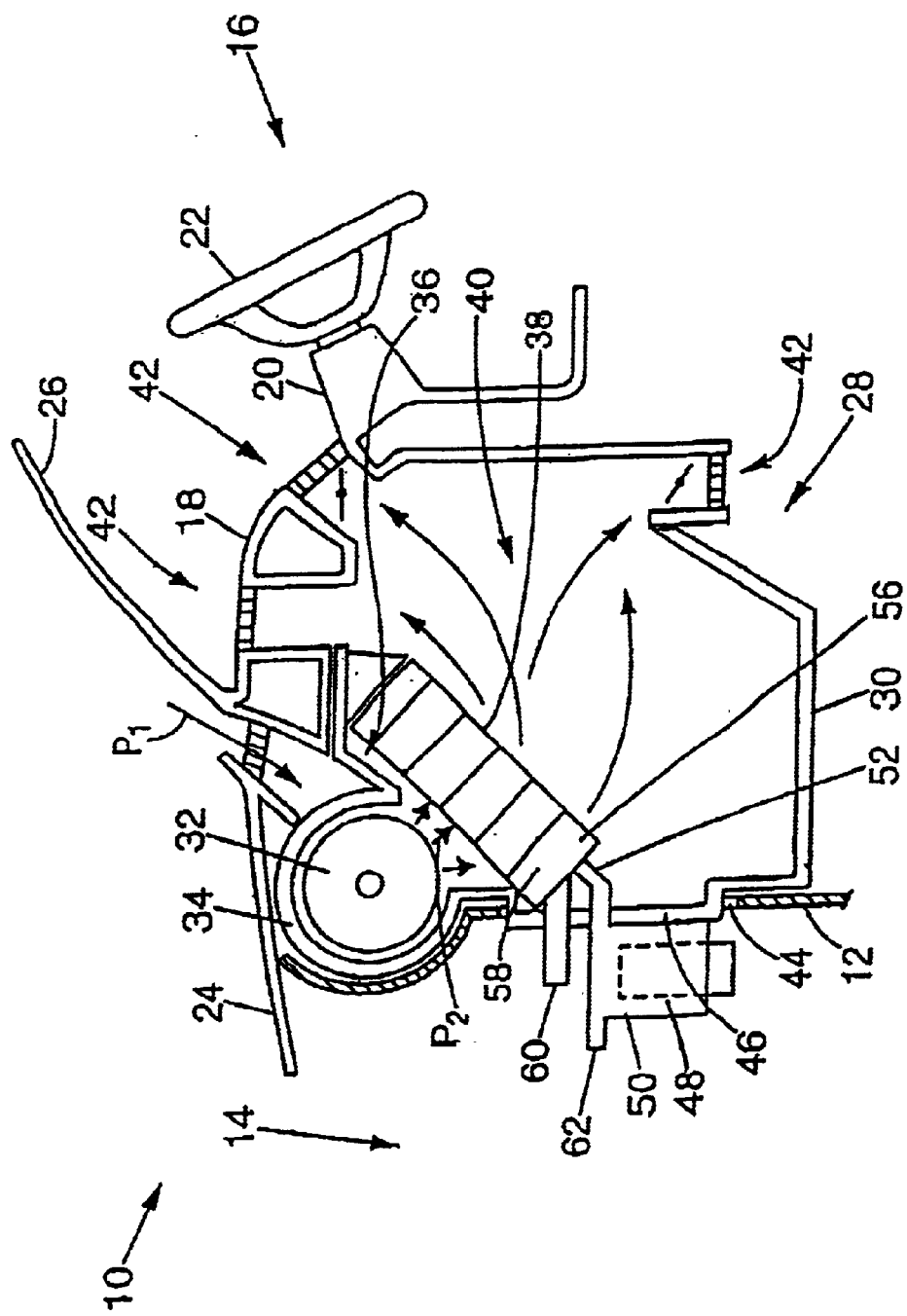

AIR TREATMENT MODULE, PARTICULARLY FOR THERMAL TREATMENT OF AIR TO BE INTRODUCED INTO A VEHICLE INTERIOR OF A VEHICLE

CROSS REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to an air treatment module, and more particularly for the thermal treatment of air to be introduced into a vehicle interior of a vehicle.

In the development of new vehicles, different system components of such a vehicle are planned for integration into the overall system in different time phases. This also above all concerns heating systems which are provided in a vehicle as supplementary or auxiliary heaters. A reason why such heaters are above all often first planned in a comparatively late development phase is that, among other things, the magnitude of the heating power deficit of the drive unit, and therefore which heating device will be required, for example as a supplementary heater, can often be first determined only comparatively late.

TECHNICAL FIELD

In the planning of such systems in a vehicle, there is furthermore the requirement of keeping the system costs concerned as small as possible. In particular, those system regions which are also already fixedly planned as regards the available constructional space are not to be adversely affected by the additional integration of such a device in a vehicle. Solutions frequently result in which the heating devices are installed in free spaces situated somewhere in the engine space. This in turn has the consequence that comparatively long hose pipes have to be prepared, in fact both for the fluid to be heated, in general a water/glycol mixture, and also for supplying the heating device with fuel. Furthermore, such spaces for building-in are often not uniformly available, particularly because of the different drive units available for different vehicle types, so that even with the same vehicle type, depending on the use of different drive units, different possibilities of building in additional devices such as a heating device have to be sought.

From DE 196 37 020 A1, a heating device is known which is connected via hose pipes to the system regions to be heated. The waste heat arising in the heating device is used in an exhaust gas heat exchanger to heat air to be introduced into the vehicle interior.

From DE 39 43 335 A1, a vehicle heating device is known in which the heat exchanger of the heating device is connected directly to the heating air heat exchanger and thus these two system components are combined into one unit.

SUMMARY OF THE INVENTION

The present invention has as its object to provide an air treatment module, in particular for the thermal treatment of air to be introduced into a vehicle interior of a vehicle, which with simple construction makes possible an integration into different system environments, for example provided by different vehicle types.

According to the present invention, this object is attained by an air treatment module, in particular for the thermal treatment of air to be introduced into the vehicle interior of a vehicle, including a support arrangement to be fixed to a vehicle, a fan arrangement supported by the support arrangement, a first heat exchanger arrangement, supported on the support arrangement, for thermal treatment of air forwarded by the fan arrangement, further including a heating device and a second heat exchanger arrangement receiving heat from the heating device, the heating device and the second heat exchanger arrangement being supported on the support arrangement.

In the air treatment module according to the invention, all the essential system components thereof are thus provided on a single support arrangement, which can then be installed, already combined into one constructional unit, on a vehicle. Thus there are omitted, besides the separate mountings for different system regions, also the hose connection pipes or respectively electrical and fuel connecting leads known from the prior art.

In a particular embodiment, it can be provided that the support arrangement has a closure region which, with a support arrangement fixed to a vehicle, substantially completely closes an opening in a fire barrier separating a vehicle interior from an engine space, and that the second heat exchanger arrangement and/or the heating device is supported on the support arrangement in the region of the closure region. It is ensured by this arrangement that in general a heating device having an open flame for heating can be situated completely outside the vehicle interior also separated from the engine space by the fire barrier. In particular, it can also be provided that the heat exchanger arrangement and/or the heating device is supported on a side of the closure region to be positioned facing the engine space.

In order to be able to produce the connection between the two heat exchanger arrangements in a simple manner, a fluid outlet of the second heat exchanger arrangement is arranged on a side of the closure region to be positioned facing the vehicle interior, and it is further provided that a fluid outlet of the second heat exchanger arrangement is directly connected to a fluid inlet of the first heat exchanger arrangement, and/or that a fluid outlet of the first heat exchanger arrangement is directly connected to a duct system leading to a drive unit. In order to then be able with such an arrangement to achieve the connection to the cooling medium system of the drive unit in a simple manner, a fluid inlet of the second heat exchanger arrangement is connected to a hose pipe connection to an engine heat exchanger.

It can further be provided in the air treatment module according to the invention that the support arrangement is formed like a housing and has an outlet region for air flowing through this for entry into the vehicle interior. Furthermore, it can be provided for further system integration that an air conditioning device is supported on the support arrangement.

BRIEF DESCRIPTION OF THE DRAWING

The present invention is described in detail hereinafter with reference to the accompanying Figure, which shows a view in principle of a vehicle region containing a module according to the invention.

DETAILED DESCRIPTION OF THE INVENTION

The vehicle region 10 which can be seen in the FIGURE is divided by a fire barrier 12 substantially into a forward situated engine space 14 and a vehicle interior generally denoted by 16. In this vehicle interior 16 there are situated an instrument panel 18, the steering wheel 22 supported on a steering column 20, and also further vehicle components not further described here. The engine space 14 is closed upwardly by an engine hood 24 which is then adjoined by a windshield 26 of the vehicle 10 in the rearward direction. An air treatment module 28 with its essential system components is inserted in the vehicle interior 16. This air treatment module 28 includes a housing arrangement generally denoted by 30 and basically also forming a support for the various system components of the module 28. This housing 30 can be integrated into the vehicle 10 from the side of the vehicle interior 16, with all the components provided or supported thereon. Here a housing region 34 containing an air fan 32 comes substantially in front of the windshield 26 and under the engine hood 24, so that fresh air can reach the region of the fan 32, as indicated by an arrow $P_2$, in the transition region between the engine hood 24 and the windshield 26. It should be mentioned that here the fire barrier 12 can for example have a shape corresponding to the shape of the housing region 34 and partially surrounding this. A heat exchanger 38 is provided or supported in a housing region 36 adjoining the housing region 34. The air forwarded by the fan 32 leaves this fan 32 in the direction of arrows $P_2$ such that it flows toward the heat exchanger 38 and passes through this or flows along its surface, in order to come into heat exchange contact with the heat exchanger 38. In an outlet region 40 of the housing 30, the thermally treated air leaves the heat exchanger 38 and is delivered into the vehicle interior 16 via various delivery points 42. Some of these delivery points 42 can be equipped with throttle flaps in order to be able to affect the air flow or air distribution in the vehicle interior 16.

It can further be seen in the FIGURE that an opening 44 is formed in the fire barrier 12. A housing region 46, for example matching in its shape the geometry of the opening 44, extends partially through this opening 44, so that when the housing 30 is integrated into the vehicle 10 the opening 44 in the fire barrier 12 is substantially completely closed by means of this closure region 46 of the housing 30. Here it can be advantageous to provide additional adapter regions in the closure region 46 for insertion for different vehicle types, in order to be able to match various geometries of the opening 44.

In the housing region 46, a heating device 48 with a further heat exchanger 50 is supported on the housing 30. It can be seen that the heat exchanger 50, or an outlet region thereof, passes through the housing 30 in the housing region 46, so that it is situated with its outlet opening 52 on that side of the housing region 46 which is positioned, or to be positioned, facing the vehicle interior 16. An inlet region 56 of the heat exchanger 38 provided for the air to be heated is directly connected to this outlet region 52 of the heat exchanger 50. In a corresponding manner, an outlet region 58 of the heat exchanger 38 is connected to a duct region 60 leading to the drive unit.

The heating device 48, preferably to be operated with the same fuel as the drive unit of the vehicle 10, thus transfers combustion heat to the heat exchanger 50. The fluid contained in this is conducted by a forwarding pump (not shown) to the outlet opening 52 and enters the heat exchanger 38 there. After this fluid or this liquid has flowed through the heat exchanger 38 and thus transferred heat energy to air flowing through this heat exchanger 38, the fluid leaves the heat exchanger 38 then leaves the heat exchanger 38 in the region of the outlet opening 58 in the direction of the drive unit, from which it then comes back to an inlet opening 62 of the heat exchanger 50. In this manner, the heat provided by the fuel-operated heating device 48 is very efficiently used; use can take place both for heating the vehicle interior 16 and also for heating the drive unit. It is also possible by corresponding circuit design to selectively heat only the vehicle interior 16 or the drive unit.

The mounting of the heating device 48 and also of the heat exchanger 50 allocated to this on the housing 30 can for example take place in that the heating device 48 is indirectly supported on the housing 30 in that it is fixed to the heat exchanger 50 which in turn is supported on the housing 30. Here the construction of the system region formed by the heating device 48 and the heat exchanger 50 can for example be such that the heat exchanger 50 is substantially pot-like and it of double-walled construction with heat exchanger housing and heat exchanger internal housing, so that the fluid to be heated can flow through the volume region enclosed between the tow heat exchanger housings. The heating device 48, substantially including a heating burner with combustion chamber, flame tube, fuel supply and combustion air fan, can then, as indicated schematically in the FIGURE, be inserted in the heat exchanger 50 of substantially pot-like construction and be supported on this. Thus the heating device 48, as already stated, is then thereby indirectly supported on the housing 30 or on its housing region 46, such that the heat exchanger 50 supporting the heating device 48 is fixed thereto, for example fixed by screws. It is of course also possible here to design the heat exchanger 50, for example the said heat exchanger housing thereof, integrally with the housing 30 or the housing region 46 thereof, so that by the integral design the heat exchanger 50 or a region thereof is supported on the housing 30. The heating device 48 can also then be again indirectly supported on the housing 30 by means of the heat exchanger 50. It is of course also possible to fix the heating device 48 additionally or separately directly to the housing 30. It is of course also possible, in the same way as the said housing region of the heat exchanger 50, to provide other housing regions of the housing 30 as integral components of an overall housing, such as e.g. the two housing regions 34, 35 which receive the fan 32 and the heat exchanger 38. In each case the advantage results that all the essential system components of the air treatment module 28 according to the invention are supported on a single housing 30, for example assembled from several housing parts or formed substantially in one piece, and can be integrated together with this into the vehicle 10. Preferably it is not required to provide any hose pipe connections between the two heat exchangers 50 and 38, which for example would be required if the heating device 48 with the associated heat exchanger 50 were to be fitted somewhere in another region of the engine space 14. Likewise it is ensured that the heating device 48 is situated completely on that side of the fire barrier 12 or also of the housing region 46 which is positioned facing the engine space 14 or is situated in this. The heating device 48 is thus situated completely outside the vehicle interior 16. The direct connection between the two heat exchangers can for example take place in that these or their respective housings are directly set against each other with the interposition of sealing members and are connected together. For this purpose, a connecting stub or the like can be provided at least on one of the heat exchangers or on the housing thereof. It is likewise also possible that a comparatively short pipe duct portion, constituted separately from the heat exchangers 50, 38, produces a connection, for example when the housing of the heat exchanger 50 is formed separately from the housing region 46 and is to be bridged over by means of such a pipe duct portion of the housing region 48. Since such pipe duct portions can have a comparatively short length in the region of a few centimeters; a connection to be considered as direct in the sense of the present invention can also thereby be generated.

It is mentioned that very varied modifications can of course be made to the module 28 according to the invention without thereby departing from the basic principle of providing all system components essential to the module on the module itself. Thus it is of course possible to embody the housing 30 with another shape. It is likewise possible to additionally provide an air conditioning unit on the housing 30, possibly also, with the use of the heat exchanger 38, to take heat from the air forwarded by the fan 32 in order thus to introduce cooled air into the vehicle interior 16. Furthermore it is a matter of course that the housing 30 can likewise have different shapes, conforming to the position of the various air outlet points 42. It is also furthermore a matter of course that the fan 30 can also be changed over to circulating air operation, by connection with corresponding current supplies, for example on the instrument panel 18, and the air to be thermally treated is then not drawn from outside but from the vehicle interior 16, is thermally treated and if necessary also filtered, and then conducted into the vehicle interior 16 again. Further more it is of course also possible to simultaneously also provide on the module 28 embodied according to the invention a control unit for the various system components, and the said unit can then be connected by a connecting lead to the electronic system of the vehicle itself.

We claim:

1. Air treatment module, for thermal treatment of air to be introduced into a vehicle interior (16) of a vehicle (10), comprising:

a support arrangement (30) fixed to a vehicle (10), a fan arrangement (32) supported by the support arrangement (30), a first heat exchanger arrangement (38), supported on the support arrangement (30), for thermal treatment of air forwarded by the fan arrangement (32), and a fuel-driven heating device (48) supported on the support arrangement (30), wherein the support arrangement (30) has a closure region (46), which in a condition in which the support arrangement (30) is positioned on a side of a fire barrier (12) facing the vehicle interior (16) completely closes an opening (44) in the fire barrier (12), said fire barrier (12) separating the vehicle interior (16) from an engine space (44), and wherein the heating device (48) with a second heat exchanger arrangement (50) is supported on a side of the closure region (46) positioned facing the engine space (14), wherein a fluid flowing through the second heat exchanger arrangement (50) is introduced into said first heat exchanger arrangement (38) in order to apply heat to the air forwarded by said fan arrangement (32).

2. Air treatment module according to claim 1, wherein a fluid outlet (52) of the second heat exchanger arrangement (50) is arranged on a side of the closure region (46) positioned facing the vehicle interior (16).

3. Air treatment module according to claim 1, wherein a fluid outlet (52) of the second heat exchanger arrangement (50) is directly connected to a fluid inlet (56) of the first heat exchanger arrangement (38).

4. Air treatment module according to claim 1, wherein a fluid outlet (58) of the first heat exchanger arrangement (38) is directly connected to a duct system (60) leading to a drive unit.

5. Air treatment module according to claim 1, wherein a fluid inlet (62) of the second heat exchanger arrangement (50) is connected through a hose pipe connection to an engine heat exchanger.

6. Air treatment module according to claim 1, wherein the support arrangement (30) is formed as a housing and has an outlet region (40) for air flowing through the support arrangement for entry into the vehicle interior (16).

7. Air treatment module according to claim 1, wherein an air conditioning unit is supported on the support arrangement (30).

8. Air treatment module for thermal treatment of air to be introduced into a vehicle interior (16) of a vehicle (10), comprising:

a support arrangement (30) fixed to a vehicle (10), a fan arrangement (32) supported by the support arrangement (30), a first heat exchanger arrangement (38), supported on the support arrangement (30), for thermal treatment on air forwarded by the fan arrangement (32), a heating device (48), a second heat exchanger arrangement (50) receiving heat from the heating device (48), the heating device (48) and the second heat exchanger arrangement (50) being supported on the support arrangement (30), wherein a fluid outlet (52) of the second heat exchanger arrangement (50) is arranged on a side of the closure region (46) positioned facing the vehicle interior (16).

* * * * *